(12) United States Patent
Welle

(10) Patent No.: US 6,827,046 B2
(45) Date of Patent: Dec. 7, 2004

(54) SYSTEM AND METHOD FOR CONVERTING A LIQUID INTO A VAPOR

(75) Inventor: Paul John Welle, Victoria (CA)

(73) Assignee: Greenlight Power Technologies, Inc., Sidney (CA)

( * ) Notice: Subject to any disclaimer, the term of this patent is extended or adjusted under 35 U.S.C. 154(b) by 0 days.

(21) Appl. No.: 10/439,242

(22) Filed: May 16, 2003

(65) Prior Publication Data

US 2004/0069242 A1 Apr. 15, 2004

Related U.S. Application Data

(60) Provisional application No. 60/380,845, filed on May 17, 2002.

(51) Int. Cl.[7] ............................................... F22B 27/00
(52) U.S. Cl. ....................................... 122/40; 122/367.1
(58) Field of Search ........................ 122/40, 41, 367.1, 122/446, 448.1, 449, 452, 487; 392/451, 485, 497; 126/350.2, 355.1

(56) References Cited

U.S. PATENT DOCUMENTS

| 2,129,596 | A | | 9/1938 | Waterman et al. | |
|---|---|---|---|---|---|
| 4,017,566 | A | | 4/1977 | Seidel | |
| 4,028,626 | A | | 6/1977 | Motley et al. | |
| 4,059,657 | A | | 11/1977 | Hay | |
| 4,075,297 | A | | 2/1978 | Seidel | |
| 4,097,936 | A | | 7/1978 | Brite | |
| 4,155,001 | A | | 5/1979 | Schossow | |
| 4,270,505 | A | | 6/1981 | Johnson | |
| 4,271,791 | A | * | 6/1981 | Kime | ........................... 122/39 |
| 4,336,783 | A | | 6/1982 | Henson | |
| 4,693,853 | A | | 9/1987 | Falb et al. | |
| 4,770,168 | A | | 9/1988 | Rusz et al. | |
| 4,786,782 | A | * | 11/1988 | Takai et al. | .................. 392/492 |
| 4,798,689 | A | | 1/1989 | Heim et al. | |
| 4,879,997 | A | | 11/1989 | Bickford | |
| 5,038,394 | A | | 8/1991 | Hasegawa et al. | |
| 5,392,738 | A | * | 2/1995 | Tsutsumi | ...................... 122/39 |
| 5,438,642 | A | * | 8/1995 | Posen | ......................... 392/485 |
| 5,509,405 | A | | 4/1996 | Mashak | |
| 5,586,547 | A | * | 12/1996 | Nixon | ....................... 122/14.1 |
| 5,918,595 | A | | 7/1999 | Olsson et al. | |
| 5,949,958 | A | * | 9/1999 | Naperkowski et al. | ....... 392/399 |
| 5,991,507 | A | | 11/1999 | Bencsits | |
| 6,155,255 | A | | 12/2000 | Lambert | |

FOREIGN PATENT DOCUMENTS

| BE | 565 513 | 7/1960 |
|---|---|---|
| DE | 26 05 938 | 8/1977 |
| EP | 0 406 093 A1 | 1/1991 |
| EP | 1 134 493 A2 | 9/2001 |
| WO | WO 97 21057 | 6/1997 |

* cited by examiner

*Primary Examiner*—Gregory A. Wilson
(74) *Attorney, Agent, or Firm*—Bereskin & Parr

(57) ABSTRACT

A system and method for converting a liquid into a vapor are described. The system includes a housing, a liquid receptor disposed within the housing for accepting the liquid, a liquid inlet for delivering the liquid from outside the housing to the liquid receptor, and a measuring device for determining the amount of liquid delivered to the liquid receptor. The system further includes a heater for heating the liquid delivered to the liquid receptor to thereby convert the liquid to a vapor, and an outlet for discharging the vapor outside the housing.

41 Claims, 4 Drawing Sheets

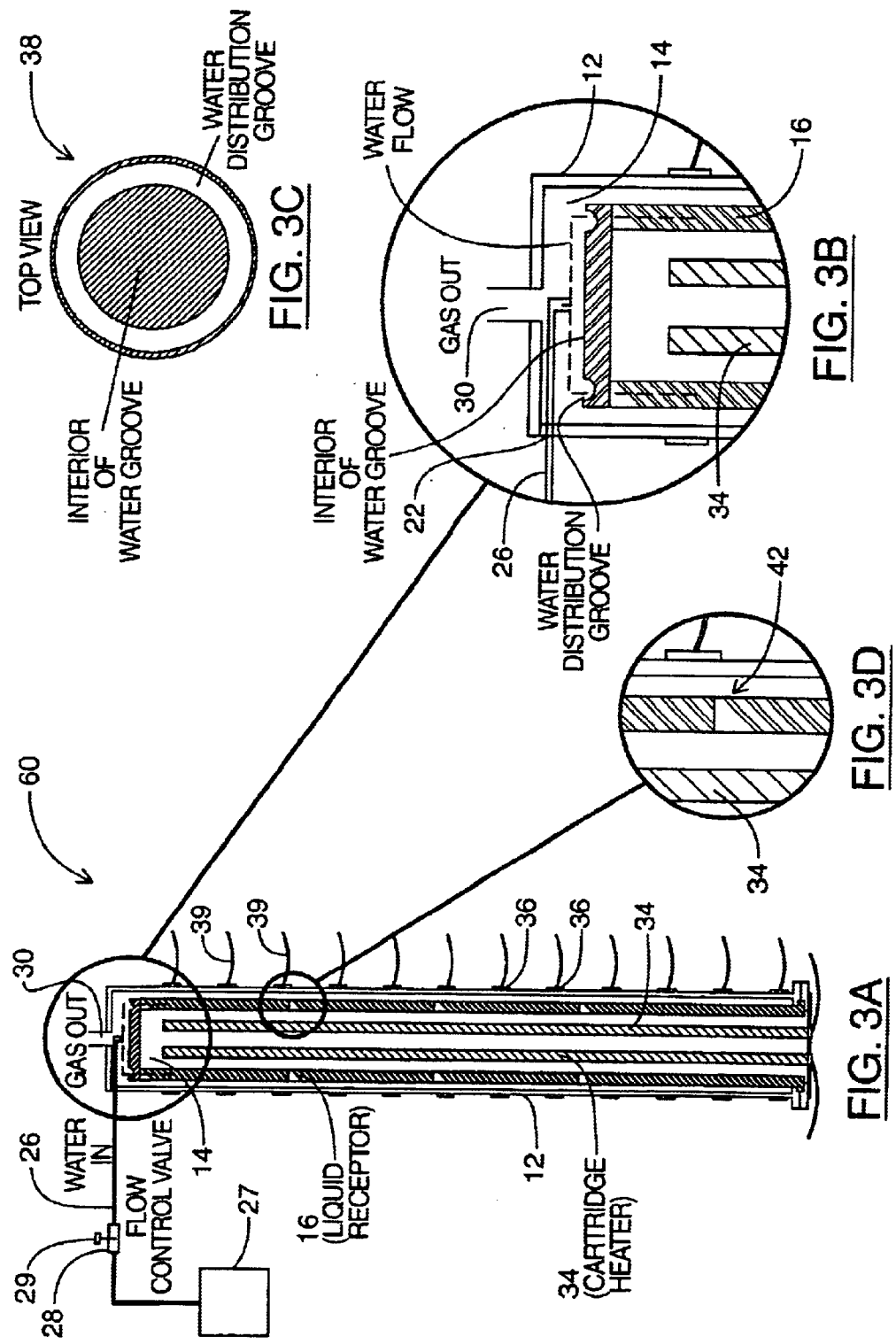

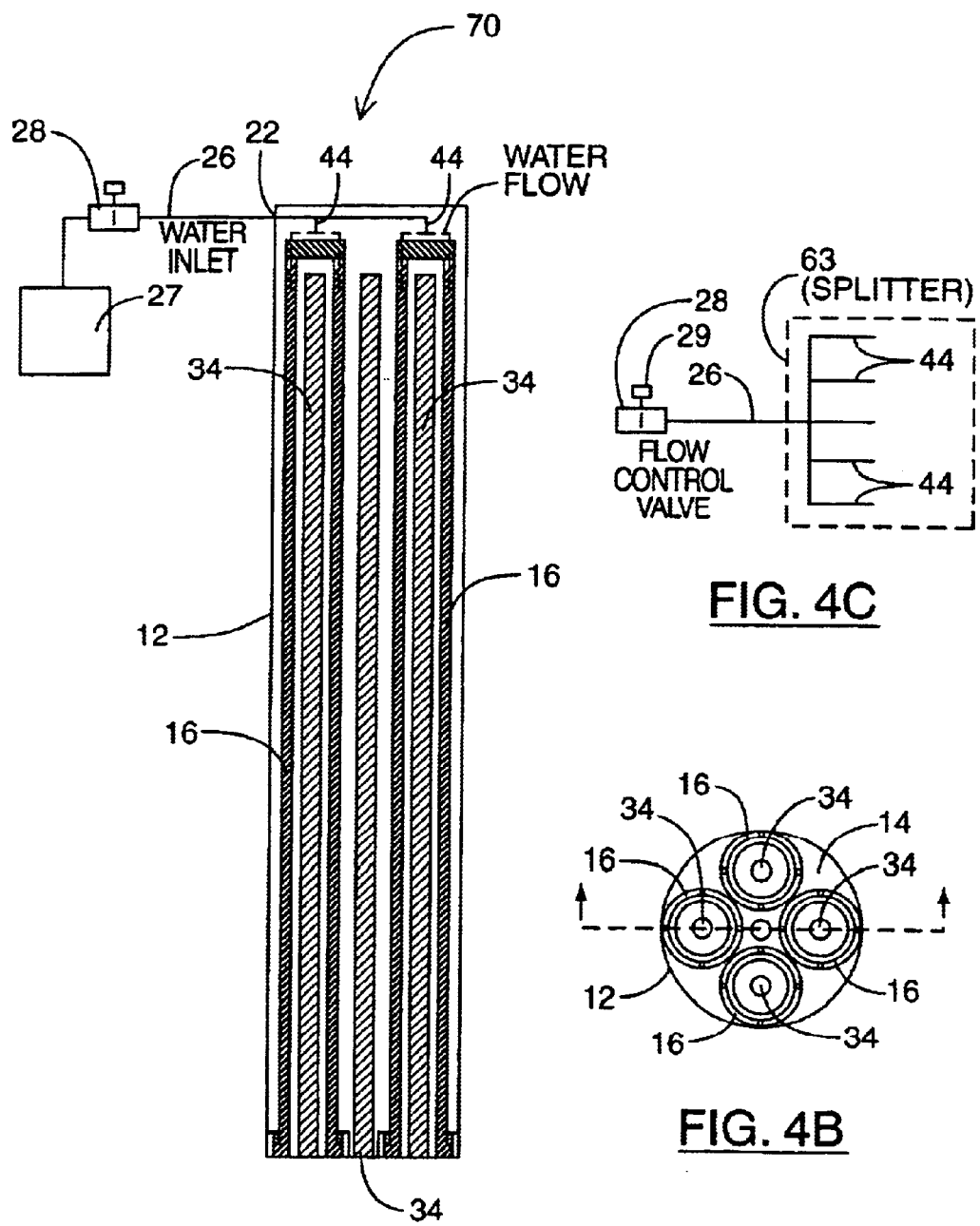

SYSTEM AND METHOD FOR CONVERTING A LIQUID INTO A VAPOR

FIELD OF THE INVENTION

This application relates to systems and methods for converting a liquid into a vapor.

BACKGROUND OF THE INVENTION

Fuel cells, fuel processors (e.g. reformers, burners and catalysts) and gas purification systems utilize various gaseous reactants. Depending upon the system configuration, gases such as hydrogen, oxygen, carbon dioxide, nitrogen and methane may be employed in different proportions. For many of these configurations it is critical that gaseous influents supplied to the system be accompanied by a minimum amount, of humidity. Failure to maintain an acceptable water to carbon ratio can lead to carbonization of the system and degradation of fuel cell or fuel processor performance, particularly in the case of molten carbonate and solid oxide fuel cells, and gasoline, diesel and natural gas reformers, where gases are delivered at very high temperatures. For example, without appropriate amounts of humidity, fuel cell membranes in proton exchange membrane (PEM) fuel cells can lose their property to transport protons and might eventually become brittle and break.

Conventional vaporizer designs include a reservoir of liquid that is vaporized and replenished. However, the amount of liquid in the reservoir at any given moment is not accurately measurable. Vapor metering is possible but it is complex and impractical for many applications. Typically expensive mass flow meters and control valves are required. These instruments have limits regarding operational ranges of pressure, temperature and flow turndown. Moreover, injecting or spraying liquid on to a hot surface is not workable for large liquid flows due to the large amount of heat and surface required to vaporize all of the liquid (and avoid liquid pooling). Liquid pooling is undesirable because the collected liquid does not participate in the vaporizing process and thus has to be purged at intervals.

The need has therefore arisen for a system and method for converting a liquid into a vapor that avoids liquid pooling, and that can accurately meter the amount of liquid converted into vapor.

SUMMARY OF THE INVENTION

Described herein is a system for converting a metered amount of liquid into a vapor. The system includes a housing, a liquid receptor, that is preferably porous, disposed within the housing for accepting the liquid, a liquid inlet for delivering the liquid from outside the housing to the liquid receptor, and a measuring device for determining the amount of liquid delivered to the liquid receptor. The system further includes a heater for heating the liquid delivered to the liquid receptor to thereby convert the liquid to a vapor, and an outlet for discharging the vapor outside the housing.

The housing defines an internal chamber, in which resides the liquid receptor. The liquid receptor can be composed of a porous ceramic. The liquid receptor has a sufficiently large wettable surface area and temperature to evaporate all of the liquid introduced onto the liquid receptor, thereby avoiding liquid pooling. Liquid travels from the introduction area(s) of the liquid receptor to more remote areas of the liquid receptor by gravity feed and capillary forces.

In one embodiment, the liquid receptor may have the shape of an elongate hollow cylinder. The liquid receptor may be heated in many different possible ways, such as using radiant, induction or convective heating. For example, a cartridge heater may be positioned within an internal cavity of the liquid receptor. Additionally or alternatively a plurality of band heaters may be mounted on the housing to heat the internal chamber. In another embodiment of the invention a stream of heated gas may be passed through the chamber in proximity to the liquid receptor, such as through a central cavity of the liquid receptor. In this embodiment the gas stream may be mixed with the evaporated liquid within the internal chamber prior to expulsion of the vapor and gas mixture through the outlet.

In one embodiment of the invention the internal chamber may be pressurized. Preferably the amount of liquid introduced into the internal chamber is accurately measured at ambient pressure and temperature at a flow location upstream from the system for converting. Conventional inexpensive measuring devices, such as a flow meter or metering pump, can be used to measure the amount of liquid supplied to the liquid receptor.

In alternative embodiments of the invention, the system may comprise multiple heated liquid receptors arranged within the housing. The liquid receptors may be arranged within a single internal chamber or multiple chambers may be provided. The invention may further include a splitter for diverting liquid from a primary liquid supply line to each of the heated liquid receptors. Preferably the splitters divert liquid evenly to the circumferential surface of each liquid receptor.

Also described herein is a method for converting a liquid into a vapor. The method includes disposing a, preferably porous, liquid receptor within a housing, delivering the liquid from outside the housing to the liquid receptor via a liquid inlet, and determining the amount of liquid delivered to the liquid receptor with a measuring device. The method also includes heating the liquid delivered to the liquid receptor with a heater to thereby convert the liquid to a vapor, and discharging the vapor outside the housing.

In particular, the method includes the step of providing a liquid receptor for accepting liquid from a liquid source. The liquid receptor is enclosed within a housing. A liquid inlet permits liquid to enter the housing. The method further includes the steps of measuring the amount of liquid delivered from the liquid supply to the liquid inlet, introducing liquid from the liquid inlet into the internal chamber, heating the porous liquid receptor to evaporate all of the liquid introduced into the internal chamber, and discharging the resultant vapor from the internal cavity through the outlet. The invention ensures that all liquid delivered to the liquid receptor is continuously evaporated, even at relatively large liquid flow rates (e.g. up to 500 ml per minute, or more depending upon the required vapor mass flow rate).

In alternative embodiments of the invention, the step of heating the porous liquid receptor may include the step of passing a heated gas through the internal chamber in the vicinity of the liquid receptor. The method may further include the step of mixing the heated gas and the evaporated liquid within the internal chamber of the housing to humidify the gas stream prior to discharging the gas and vapor mixture through the outlet.

In other embodiments of the invention, the method may include the step of pressurizing the internal chamber of the housing. The liquid receptor is heated to a temperature substantially above the boiling temperature of the liquid at the applicable vapor pressure. The step of measuring the volume of fluid preferably is performed at known temperature and pressure, such as ambient temperature and pressure, at a flow location upstream from the liquid inlet.

BRIEF DESCRIPTION OF THE DRAWINGS

For a better understanding of the present invention and to show more clearly how it may be carried into effect, reference will now be made, by way of example, to the accompanying drawings, in which:

FIG. 3A is a longitudinal sectional view similar to FIG. 1 of an elongated system comprising multiple heaters located inside the liquid receptor, as well as multiple liquid receptor sections assembled together;

FIG. 3B is an enlarged view of an upper portion of the system of FIG. 3A;

FIG. 3C is a top plan view of a liquid distribution ring forming part of the porous liquid receptor of FIG. 3A;

FIG. 3D is an enlarged view of a side section of the liquid receptor illustrating two liquid receptor sections connected together;

FIG. 4A is a longitudinal sectional view of an alternative embodiment of the invention comprising multiple liquid receptors mounted within a common housing;

FIG. 4B is a top plan view of the embodiment of FIG. 4A; and

FIG. 4C is a schematic view of the liquid distribution system of the embodiment of FIG. 4A.

DETAILED DESCRIPTION OF THE INVENTION

A system is described herein for completely converting a known amount of liquid into a gas, such as water into steam. The steam may be mixed with a gas before the humidified gas is delivered to a reaction vessel, such as a fuel cell stack or fuel processor. Suitable liquids include water, alcohols, such as methanol, gasoline, and oils.

Figure 1:
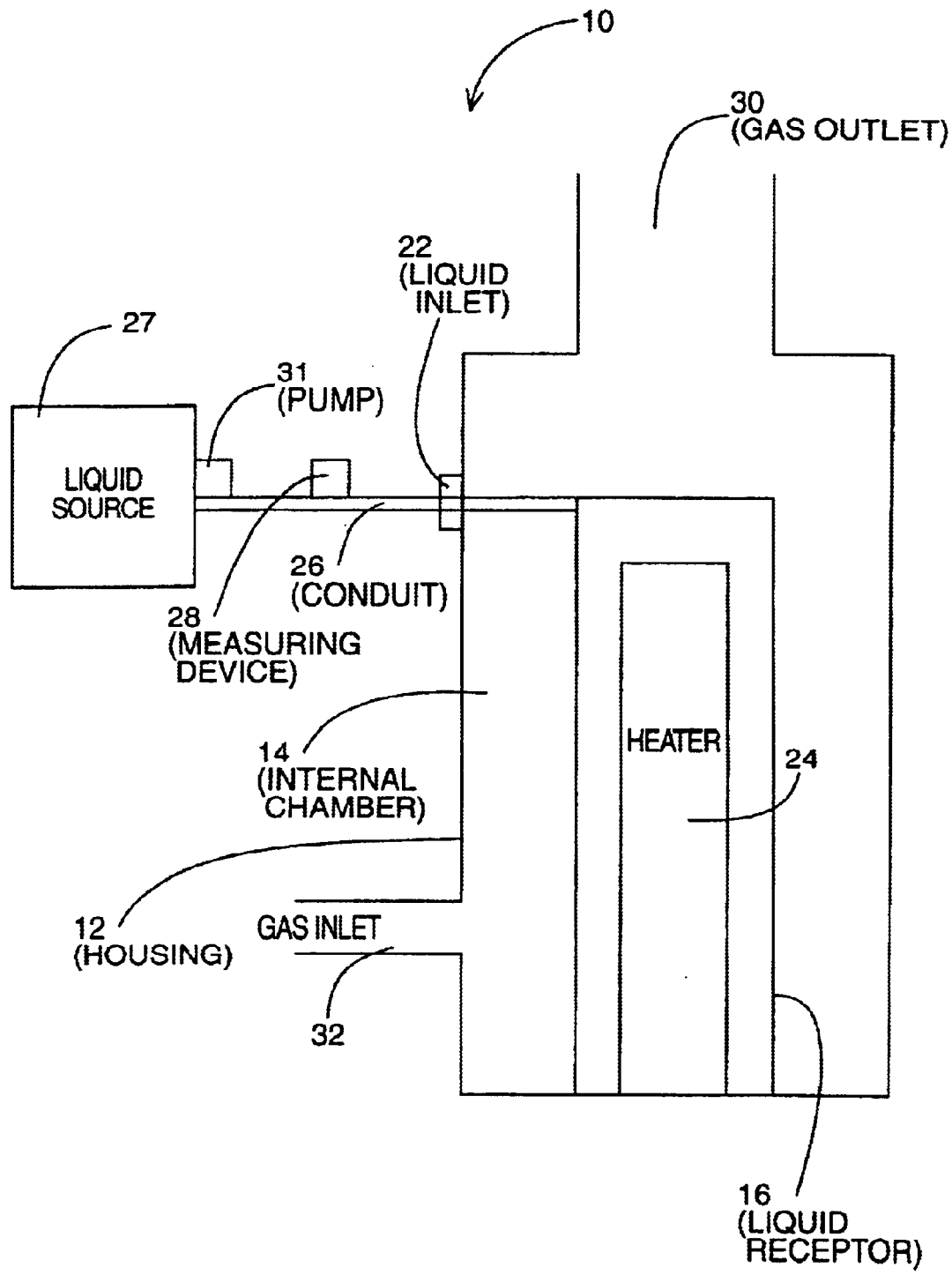
FIG. 1 shows a system for converting a liquid into a vapor, according to the teachings of the present invention.

FIG. 1 shows a system 10 for converting a liquid into a vapor (or vapor). The system 10 includes a housing 12 defining an internal chamber 14. The system 10 also includes a liquid receptor 16 disposed within the internal chamber 14 of the housing 12, a liquid inlet 22, a measuring device 28, a heater 24 and an outlet 30. The system 10 can further optionally include a gas inlet 32, and a supply conduit 26 connected to a liquid source 27.

The liquid inlet 22 delivers the liquid from outside the housing 12 to the liquid receptor 16. The measuring device 28 determines the amount of liquid delivered to the liquid receptor 16. The heater 24 heats liquid receptor 16, and thus the liquid delivered to the liquid receptor, to thereby convert the liquid to a vapor. The heater 24 can include convective, conductive, inductive or radiant heaters. The heater 24 can also be a stream of hot gas that can be delivered into the housing via the gas inlet 32 or some other opening. The outlet 30 allows for the discharge of vapor, and gas, when present, from inside to outside the housing 12.

The liquid receptor 16 is preferably composed of a porous material to permit the liquid to spread throughout the liquid receptor thereby increasing the surface area of the liquid and facilitating the evaporation of the liquid into a vapor. Additionally, the liquid receptor 16 should be inert enough to withstand heating by the heater 24. A material having these characteristics that may be fashioned into a liquid receptor is a ceramic material, or other porous/sponge type material, such as nickel foam or sintered metals. The liquid receptor 16 may be a hollow cylinder. Alternatively, the liquid receptor can be of solid construction and further be of different geometric shape, such as round, square, rectangular, pentagonal, hexagonal, octagonal or oval. The actual cross-sectional shape of the liquid receptor is determined by size requirements and manufacturing requirements. If the liquid receptor 16 is hollow, the heater 24 can be conveniently located within the hollow of the liquid receptor 16.

The system 10 can include a liquid source 27 for storing the liquid outside the housing 12. A supply conduit 26 serves to deliver liquid from the liquid source 27 to the liquid inlet 22. To transport the liquid from the liquid source, a pump 31, or other pressurizing means, may be used.

The system 10 may include a gas inlet 32 for supply of a gas into the housing 12. The gas may then be mixed within the housing 12 with the vapor obtained from the evaporation of the liquid. The gas and vapor mixture can subsequently be discharged through the outlet 30.

The measuring device 28 is coupled to the supply conduit 26 for determining the amount of liquid delivered to the liquid receptor 16. Metering can occur in several ways. For example, liquid gauges can be used to determine the flow of liquid through the conduit 26. Alternatively, or in addition, a known volume of liquid can be introduced into the conduit 26 as a batch process. In this manner, the amount of vapor discharged from the housing 12 can be controlled.

The system 10 efficiently converts the liquid to a vapor without liquid pooling or substantial losses. Generally, if the liquid is delivered onto the liquid receptor at a certain mass flow rate (mass of liquid per unit time), the resultant vapor is discharged at substantially the same mass flow rate (mass of vapor per unit time). To achieve this, the capacity of the various heaters to deliver heat to the liquid receptor 16 is greater than the power, i.e. heat flow per unit time, necessary to evaporate liquid at the maximum desired liquid flow rate, thereby to ensure continuous evaporation of liquid without any accumulation or pooling. Liquid can also be supplied in batches, with each batch being a measured amount of liquid and with the spacing in time of the batches determining the average liquid flow rate.

Figure 2:
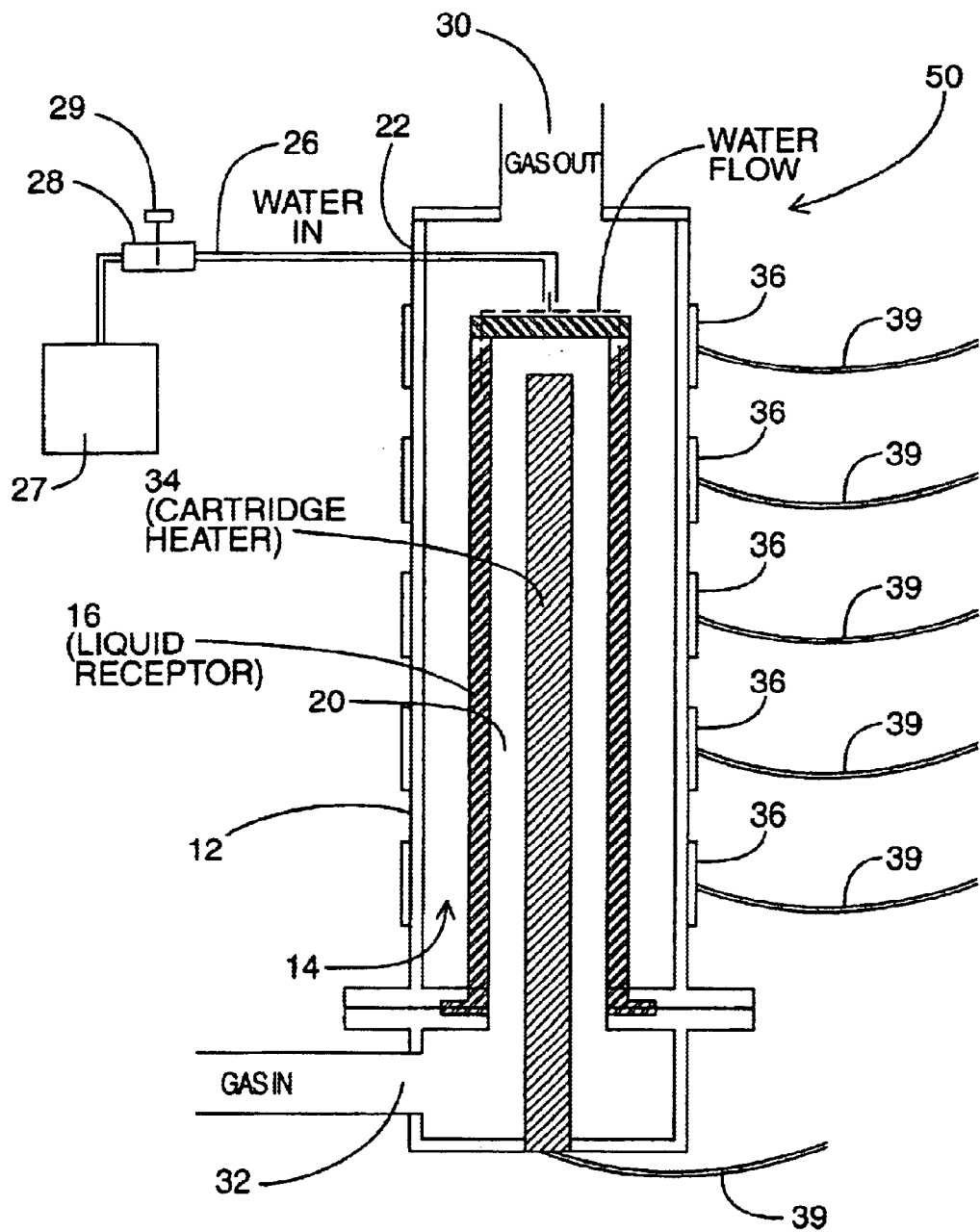
FIG. 2 is a longitudinal sectional view of a system for converting a liquid into a vapor, according to one embodiment of the invention.

FIG. 2 shows a system 50 for converting a liquid into a vapor with a cartridge heater 34 and band heaters 36. The system 50 includes the housing 12 defining the internal chamber 14. The porous liquid receptor 16, having an internal cavity 20, is mounted within the internal chamber 14.

The liquid inlet 22 allows the liquid to enter the housing 12. The liquid is transferred from the liquid source 27 to the liquid inlet 22 via the supply conduit 26. The measuring device 28, such as a flow meter containing a flow control valve 29, is provided for accurately measuring the volume of liquid delivered to the inlet 22. The liquid source 27 may contain, for example, a supply of deionized water or methanol.

The housing 12 also includes the outlet 30 for discharging the evaporated liquid from the chamber 14. The vapor may be mixed with a separate gas stream to produce a humidified gas mixture. The mixing can occur within the housing 12, upstream from the outlet 30, or outside the housing 12, downstream from the outlet 30. In the former embodiment, the separate gas stream is introduced into the chamber 14 through the gas inlet 32.

In the illustrated embodiment, the cartridge heater 34 is positioned within the internal cavity 20 of the liquid receptor 16. Additionally, the plurality of band heaters 36 are mounted on the outside of the housing 12 at spaced intervals. Heaters 34 and 36 may be connected to a power source (not shown) such as by wires 39. In the illustrated embodiment, the liquid receptor 16 is conductively, convectionally and radiantly heated by the heaters 34 and 36, but other heating means can also be employed, such as inductance heating. In addition, rather than employing heaters 34, 36, a heated gas stream may be introduced into the internal cavity 20 of the liquid receptor 16 (or elsewhere in chamber 14) through gas inlet 32. It will be understood that, in this embodiment, the liquid receptor 16 is porous, to permit the gas to pass through it.

The liquid receptor 16 is heated to a sufficiently high temperature to evaporate all of the liquid introduced into the chamber 14 through inlet 22 (thereby preventing pooling of liquid within the housing 12). In particular, the liquid receptor 16 is ordinarily heated to a temperature well above the boiling temperature of the liquid in question. For example, in the case of deionized water, the internal chamber 14 and the enclosed liquid receptor 16 are preferably heated to a temperature of approximately 200° C., although temperatures closer to the boiling point of water could be employed.

FIGS. 3A–3D illustrates a system 60 for converting a liquid to a vapor having a liquid distributor 38 in the form of a lid mounted on an upper surface of the liquid receptor 16. The liquid distributor 38 is configured to distribute liquid passing through the liquid inlet 22 from a central portion of the lid of the liquid receptor 16 into an annular groove 40 located at the periphery of the lid. The liquid flows through the annular groove 40 and onto the circumferential surface of the liquid receptor 16 where it either evaporates or flows further through and into the liquid receptor to eventually evaporate when it reaches hotter parts of the liquid receptor. The resultant vapor is then discharged through the outlet 30. The liquid distributor 38 prevents liquid from pooling on an upper surface of the liquid receptor 16, which might otherwise occur at high flow rates. As will be appreciated by a person skilled in the art, other similar means for distributing liquid evenly on the liquid receptor surface to promote relatively uniform evaporation may be envisaged. In the shown embodiment, two cartridge heaters 34 are located inside the liquid receptor cavity, for efficient heating of the relatively large liquid receptor surface area.

FIG. 3D illustrates a detail of the embodiment of FIGS. 3A–C, wherein the liquid receptor 16 is constructed from a plurality of separate sections of a refractory material that are assembled together. Each pair of separate sections is connected at a stepped joint 42 comprising abutting vertical and horizontal surfaces. Similarly a stepped joint is formed between the liquid distributor 38 and the top most section of the liquid receptor 16. In this embodiment all the abutting vertical surfaces only are cemented together with a refractory cement to permit fluid to pass through horizontal surfaces of the joints 42 between abutting sections.

FIGS. 4A–4C illustrate a system 70 for converting a liquid to a vapor having a plurality of liquid receptors 16 arranged within a single internal chamber 14 of the housing 12. The system 70 includes a splitter 62 having supply lines 44 and connecting the liquid inlet 22 to each of the supply lines 44, each of which delivers liquid to a respective liquid receptor 16.

The splitter 62 divides the liquid entering the housing 12 so that liquid is supplied to each liquid receptor 16. In particular, liquid from the inlet 22 is diverted within the housing 12 to each of the separate liquid receptors 16 through the fluid supply lines 44 (FIG. 4C). The amount of liquid delivered to the system 60 is metered by the measuring device 28 upstream from the inlet 22. The embodiment of FIGS. 4A–4C can potentially handle larger liquid flow rates than the embodiment of FIG. 1 or 2 comprising a single liquid receptor 16.

In this embodiment, there are four liquid receptors 16, each with a respective cartridge heater 34, arranged in a square (FIG. 4B). Additionally, a central cartridge heater 34 is provided between the four liquid receptors, to promote vaporization. As before, additional heating devices, such as band heaters on the housing 12, can be provided.

As will be appreciated by a person skilled in the art, a plurality of systems 10, 50, 60 or 70 can also be arranged in parallel to handle larger liquid flow rates if required for a particular application.

In operation, the systems 10, 50, 60 or 70 are connected to a liquid source 27, such as a source of deionized water, by the liquid supply conduit 26. The internal chamber 14 of the housing 12 is pre-heated by means of the cartridge heater 34, the band heaters 36 or by circulating a heated gas stream through chamber 14, as described above.

The liquid receptor 16 housed within the internal chamber 14 is heated to the desired temperature by means of radiant or convective heat transfer, for example. Induction heating may also be employed, when suitable materials are used. For induction heating, a metallic material liquid receptor is used.

Liquid is delivered to the system 10, 50, 60 or 70 in precisely metered amounts as recorded by the measuring device 28. After passing through the liquid inlet 22, the liquid, such as water, is diverted to the circumferential surface of the liquid receptor 16 where it evaporates to form vapor, such as steam. The steam is expelled from the system through the outlet 30. The temperature and surface area of the liquid receptor 16 are sufficiently large that all of the liquid introduced into chamber 14 is quickly evaporated and no pooling of liquid occurs.

The liquid receptor 16 therefore functions as a liquid reservoir. This liquid receptor-type reservoir creates a very large wetted area compared to a typical liquid reservoir. Further, the total amount of liquid in the liquid receptor 16 is significantly less than a typical reservoir. This allows for more accurate, fast-response vapor delivery.

The vapor produced by the system 10 may then be mixed with a separate gas stream downstream from the system 10 to produce a humidified gas stream. The humidified gas stream may then be delivered to a reaction vessel such as a fuel cell stack or fuel processor. Many other applications for a precisely metered supply of humidified gas may also be envisaged.

In an alternative embodiment of the invention described above the separate gas stream may be humidified within the system 10. In this embodiment the gas stream to be humidified is introduced into the chamber 14 through the gas inlet 32 (in either a heated or unheated state). The gas stream mixes with the gas produced within chamber 14 by evaporation of the liquid. The gas mixture is then discharged through the outlet 30 in a humidified state.

The foregoing embodiments of the present invention are meant to be exemplary and not limiting or exhaustive. For example, although emphasis has been placed on systems that evaporate water to produce steam, other liquids, such as methanol or gasoline, can also be converted into a vapor in metered amounts, in accordance with the principles of the present invention. The scope of the present invention is only to be limited by the following claims.

Further, while the invention has applications in various technologies, as indicated above, it is expected to be particularly application to PEM and other types of fuel cells, for humidifying one or both of a fuel gas stream, and an oxidant gas stream.

It will be understood that while vapor generated from a liquid will be below the critical temperature of the liquid, the vapor need not be maintained at this temperature. For some applications, the vapor may be further heated, either within or outside of the housing, to a temperature above the critical temperature, so as to be a gas.

What is claimed is:

1. A system for converting a liquid into a vapor, the system comprising
   a housing;
   a liquid receptor disposed within the housing, the liquid receptor having a wettable surface area onto which the liquid spreads by a force that is principally at least one of a gravitational force and a capillary force;
   a liquid inlet for delivering the liquid from outside the housing to the liquid receptor;
   a measuring device for determining the amount of liquid delivered to the liquid receptor;
   a heater for heating the liquid delivered to the liquid receptor to thereby convert the liquid to a vapor; and
   an outlet for discharging the vapor outside the housing, wherein the wettable surface area and the heating is great enough to prevent the liquid from pooling in the housing.

2. The system of claim 1, wherein the liquid receptor is vertically cylindrical.

3. The system of claim 1, further comprising
   a liquid source for storing the liquid outside the housing; and
   a supply conduit for delivering the liquid from the liquid source to the liquid inlet.

4. The system of claim 3, wherein the measuring device is coupled to the supply conduit for determining the amount of liquid delivered to the liquid receptor.

5. The system of claim 4, wherein the measuring device includes a flow control valve.

6. The system of claim 1, wherein the liquid receptor is hollow.

7. The system of claim 6, wherein the heater includes at least one cartridge heater that is disposed within the hollow of the liquid receptor.

8. The system of claim 1, wherein the heater includes a plurality of band heaters circumferentially disposed on the housing.

9. The system of claim 1, wherein the heater includes a hot gas and the housing includes a gas inlet for introduction of the hot gas.

10. The system of claim 1, wherein the heater is an induction heater having a coil arranged to heat the liquid receptor.

11. The system of claim 1, wherein the liquid receptor has a top end with a liquid distributor to distribute the liquid to the liquid receptor.

12. The system of claim 11, wherein the liquid distributor includes a groove for the liquid, said groove distributing the liquid to the liquid receptor.

13. The system of claim 1, further comprising
    a plurality of liquid receptors;
    a splitter connecting the liquid inlet to each of the plurality of liquid receptors, wherein the splitter divides the liquid entering the housing so that liquid is supplied to each liquid receptor.

14. The system of claim 13, wherein each of the plurality of liquid receptors has a top end with a groove for the liquid, said groove distributing the liquid to each of the plurality of liquid receptors.

15. The system of claim 1, further comprising a gas inlet for supply of a gas into the housing, wherein the vapor obtained by heating the liquid is mixed with the gas within the housing, whereby the mixture of the vapor and the gas is discharged through the outlet.

16. The system of claim 1, wherein the liquid receptor is constructed from a plurality of separate sections that are assembled together.

17. The system of claim 16, wherein the separate sections are connected at joints comprising abutting vertical and horizontal surfaces.

18. The system of claim 17, wherein the abutting vertical surfaces are cemented together.

19. A method for converting a liquid into a vapor, the method comprising
    disposing a liquid receptor within a housing, the liquid receptor having a wettable surface area;
    delivering a known amount of liquid to the liquid receptor via a liquid inlet;
    allowing the liquid to spread onto the wettable surface area by a force that is principally at least one of a gravitational force and a capillary force;
    heating the liquid delivered to the liquid receptor with a heater to thereby convert the liquid to a vapor, wherein the wettable surface area and the heating is great enough to prevent the liquid from pooling in the housing; and
    discharging the vapor outside the housing.

20. The method of claim 19, further comprising delivering the liquid to the liquid receptor at a first mass flow rate and discharging the vapor outside the housing occurs at a second mass flow rate, the first mass flow rate being substantially equal to the second mass flow rate.

21. The method for claim 19 further comprising delivering the liquid in successive batches, each batch of liquid having a desired volume, and spacing the batches in time, to give a desired average flow rate for generated vapor.

22. The method of claim 19, wherein the liquid receptor is composed of a porous material.

23. The method of claim 19, wherein the liquid receptor includes a ceramic.

24. The method of claim 19, comprising providing a cylindrical liquid receptor and mounting the liquid receptor vertically.

25. The method of claim 19, further comprising
    storing the liquid outside the housing before delivery to the liquid receptor; and
    delivering the liquid from the liquid source to the liquid receptor via the liquid inlet.

26. The method of claim 19, further comprising controlling the liquid flow rate with a control valve in the measuring device.

27. The method of claim 19, further comprising providing a hollow liquid receptor.

28. The method of claim 27, further comprising disposing a cartridge heater within the hollow of the liquid receptor for heating the liquid in the liquid receptor.

29. The method of claim 19, further comprising circumferentially disposing band heaters on the housing for heating the liquid in the liquid receptor.

30. The method of claim 19, further comprising introducing a hot gas into the housing to heat the liquid in the liquid receptor.

31. The method of claim 19, wherein the step of heating further includes inductively heating the liquid receptor.

32. The method of claim 19, further comprising distributing the liquid around the top of the liquid receptor with a liquid distributor.

33. The method of claim 32, further comprising providing the liquid distributor with a groove for distributing the liquid to the liquid receptor.

34. The method of claim 19, further comprising providing a plurality of liquid receptors in the housing;

connecting the liquid inlet to each of the liquid receptors with a splitter; and dividing the liquid entering the housing so that liquid is supplied to each liquid receptor.

35. The method of claim 34, further comprising providing each of the plurality of liquid receptors with a groove for distributing the liquid to each of the plurality of liquid receptors.

36. The method of claim 19, further comprising supplying a gas into the housing, mixing the vapor obtained by heating the liquid with the gas within the housing, and discharging the mixture of the vapor and the gas.

37. The method of claim 19, further comprising pressurizing the housing.

38. A system for converting a liquid into a vapor, the system comprising a housing;

a liquid receptor disposed within the housing, the liquid receptor having a wettable surface area onto which the liquid spreads by a force that is principally at least one of a gravitational force and a capillary force;

a liquid inlet for delivering the liquid from outside the housing to the liquid receptor;

a heater for heating the liquid delivered to the liquid receptor to thereby convert the liquid to a vapor, said heater being disposed inside the liquid receptor or around the external surface of the liquid receptor; and an outlet for discharging the vapor the outside the housing, wherein the wettable surface area and the heating is great enough to prevent the liquid from pooling in the housing.

39. A system for converting a liquid into a vapor, the system comprising a housing;

a liquid receptor disposed within the housing for accepting the liquid;

a liquid inlet for delivering the liquid from outside the housing to the liquid receptor;

a measuring device for determining the amount of liquid delivered to the liquid receptor;

a heater for heating the liquid delivered to the liquid receptor to thereby convert the liquid to a vapor; and an outlet for discharging the vapor outside the housing, wherein the delivery of the liquid to the liquid receptor occurs at a first mass flow rate and the discharge of the vapor outside the housing occurs at a second mass flow rate, the first mass flow rate being substantially equal to the second mass flow rate.

40. A system for converting a liquid into a vapor, the system comprising a housing;

a liquid receptor disposed within the housing for accepting the liquid, the liquid receptor composed of a porous material;

a liquid inlet for delivering the liquid from outside the housing to the liquid receptor;

a measuring device for determining the amount of liquid delivered to the liquid receptor;

a heater for heating the liquid delivered to the liquid receptor to thereby convert the liquid to a vapor; and an outlet for discharging the vapor outside the housing.

41. The system of claim 40, wherein the liquid receptor includes at least one of a ceramic, a foamed metallic material and a sintered metallic material.

* * * * *